US006866609B2

(12) United States Patent
Ervin (10) Patent No.: US 6,866,609 B2
(45) Date of Patent: *Mar. 15, 2005

(54) CONTINUOUSLY VARIABLE TRACTION DRIVE WITH TRACTION ROLLERS HAVING A CASTER ANGLE (75) Inventor: James D. Ervin, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 156 days.

This patent is subject to a terminal disclaimer.

(21) Appl. No.: 10/209,406

(22) Filed: Jul. 31, 2002

(65) Prior Publication Data
US 2004/0023753 A1 Feb. 5, 2004

(51) Int. Cl.⁷ .............................................. F16H 15/38
(52) U.S. Cl. .................................. 476/40; 476/46
(58) Field of Search .............................. 476/40, 42, 46

(56) References Cited

U.S. PATENT DOCUMENTS

| 703,237 | A | 6/1902 | Cowles |
|---|---|---|---|
| 1,904,046 | A | 4/1933 | Hayes |
| 1,981,910 | A | 11/1934 | Ehrlich |
| 2,057,136 | A | 10/1936 | Criswell |
| 2,073,134 | A | 3/1937 | Almen et al. |
| 2,124,398 | A | 7/1938 | Hayes |
| 2,124,399 | A | 7/1938 | Hayes |
| 2,126,772 | A | 8/1938 | Haskell |
| 2,910,878 | A | 11/1959 | Erban |
| 4,086,820 | A | 5/1978 | Kraus et al. |
| 4,444,068 | A | 4/1984 | Kraus |
| 4,453,427 | A | 6/1984 | Kraus et al. |
| 5,052,236 | A | 10/1991 | Nakano |
| 5,895,337 | A | 4/1999 | Fellows et al. |
| 5,902,207 | A | 5/1999 | Sugihara |
| 5,935,039 | A | 8/1999 | Sakai et al. |
| 6,080,079 | A | 6/2000 | Sakai |
| 6,287,232 | B1 | 9/2001 | Sakai et al. |

FOREIGN PATENT DOCUMENTS

| EP | 0 890 044 B1 | 11/1999 |
|---|---|---|
| JP | 2000-234670 | 8/2000 |

OTHER PUBLICATIONS

SAE Technical Paper No. 901761, by M. Nakano and T. Hibi, Nissan Motor Co., Ltd., "Dynamic Characteristics of Speed Ratio Control of the Halt Toroidal CVT for Passenger Cars", pp. 25–32.

Primary Examiner—William C. Joyce
(74) Attorney, Agent, or Firm—David B. Kelley (57) ABSTRACT

A traction drive having multiple toroidal discs and power rollers located in toroidal cavities defined by the discs. Each roller is mounted in a trunnion and the trunnion is positioned in a gimbal frame wherein the axis of the trunnion is displaced through a caster angle about the roller axis.

11 Claims, 9 Drawing Sheets

CONTINUOUSLY VARIABLE TRACTION DRIVE WITH TRACTION ROLLERS HAVING A CASTER ANGLE

CROSS-REFERENCE TO RELATED APPLICATIONS

This application discloses subject matter that relates to the subject matter disclosed in U.S. patent publication No. US-2002-0128113-A1 dated Sep. 12, 2002, based on co-pending abandoned U.S. patent application Ser. No. 09/754,164, filed Jan. 4, 2001, entitled "Control System For A Continuously Variable Traction Drive", and U.S. Pat. No. 6,575,869, dated Jun. 10, 2003. Both the patent publication and the patent are assigned to the assignee of the present application.

BACKGROUND OF THE INVENTION

1. Field of the Invention

The invention relates to a traction drive having torque-transmitting toroidal discs and power rollers with infinitely variable ratio characteristics.

2. Background Art

In a continuously variable transmission mechanism in a powertrain, the torque ratio can be changed without the usual shift between defined torque ratios as in the case of a conventional geared transmission. One class of continuously variable transmissions comprises traction drives with toroidal friction discs that register with power rollers for transmitting torque in a torque flow path from a driving member to a driven member. As in the case of other classes of infinitely variable transmissions, a toroidal drive of this kind makes it possible to reduce throttle losses and increase engine operating efficiency as the engine operates close to its minimum brake specific fuel consumption point.

Torque transfer by the friction discs and the power rollers occurs through a lubricated contact patch. Shear forces in the lubricating oil at the contact patch establish a driving torque flow between the driving member and the driven member. An example of a toroidal drive of this kind can be seen by referring to U.S. Pat. No. 5,052,236.

In the case of the traction drive disclosed in the '236 patent, the transmission ratio is changed by adjusting the spacing of the rotary axes of the power rollers relative to the rotary axis of the friction discs. This creates a misalignment of the tangential force vectors across the contact patch. Vector force components of the tangential forces create a roller tilting moment. The tilting moment adjusts the angularity of the rollers.

In a traction drive of the kind shown in the '236 patent, a reaction force is created as torque is transmitted through the drive. The reaction force is opposed by hydraulic control pistons, which create forces on the rollers to maintain their position following angular adjustment of the rollers during a ratio change. These reaction forces, which are relatively high, require a high control effort that can exceed 5,000 N per roller. Such designs create a design challenge because of the sensitivity of the relationship between transmission ratio and the hydraulic pressure acting on the hydraulic control pistons.

In a traction drive of the kind disclosed in the '236 patent, the rollers are supported by trunnions on a trunnion yoke. The transmission ratio is changed as the effective torque input radius and the effective torque output radius at the contact patches for the discs are changed due to an adjustment of the roller orientation. This adjustment is achieved by adjusting the yoke to laterally offset the roller axis relative to the disc axis, which creates a moment. This moment causes the rollers to tilt to a new ratio. When that ratio is achieved, the offset is eliminated, and the force component creating the tilting moment returns to zero.

In the case of the transmission disclosed in U.S. Pat. No. 6,575,869, the roller trunnions are offset about a gimbal axis that is parallel to the disc axis. This creates a steering moment that adjusts the inclination of the rollers. The control effort on the control pistons thus is isolated from load-bearing requirements typical of traction controls of the kind disclosed in the '236 patent. Because of the reduced forces, the rollers can readily be packaged in a group of three within each toroidal cavity. The stability of the control system thus is enhanced, and the response of the traction drive to a ratio control effort is improved. The reaction forces are transmitted to a gimbal frame, rather than to the yoke that supports the rollers. The frame can be inclined about a pivot axis that passes through two fixed gimbal supports. The inclination of the frame creates an angular offset for the rollers. This offset generates a moment that produces a change in ratio. The control forces essentially are decoupled from the force required to support the rollers.

The subject matter of U.S. Pat. No. 6,575,869 is incorporated by reference in this application.

SUMMARY OF THE INVENTION

As in the case of the transmission disclosed in U.S. Pat. No. 6,575,869, the present design uses an angular offset to minimize control loads, but the angular offset design of the present invention includes a caster control feature to control ratio without the need for providing a secondary mechanism for synchronizing the adjustment of multiple power rollers. Each power roller is supported on a trunnion and a caster angle for each trunnion achieves a stable ratio condition as a continuous function of inclination. The multiple rollers are synchronized by using the same caster angle at each trunnion. Thus, no external mechanism is required for synchronizing the ratio-changing motion of the multiple rollers.

In practicing the invention, a trunnion rotatably supports each power roller for rotation about a roller axis. A gimbal frame is rotatably supported for adjustment about a gimbal frame axis that is parallel to a common disc axis. The trunnion is supported on the gimbal frame for rotary adjustment about a trunnion axis transversely disposed relative to the common disc axis. The trunnion axis is displaced angularly at a pre-designed caster angle about the roller axis in a plane that is parallel to the disc axis.

A fixed gimbal support is provided for the discs and the gimbal frame. The trunnions are adjusted angularly about the gimbal frame axis to effect a roller steering moment to tilt the rollers to a new ratio position.

DETAILED DESCRIPTION OF THE PREFERRED EMBODIMENT

The present invention uses features that are common to the invention disclosed in U.S. Pat. No. 6,575,869. It uses a caster-based control that does not require a synchronizing mechanism for angularly adjusting ratio for multiple power rollers. To explain this characteristic of the caster-based ratio control of the invention, the designs of the '236 patent and the '869 patent first will be described briefly with reference to FIGS. 1, 1a, and 2.

As in the case of the design of the co-pending patent application Ser. No. 09/753,696, the design of the present invention uses an angular offset feature to adjust a so-called master roller, which in turn is used to adjust a number of "slave" rollers through mechanisms that synchronize the angular steering input.

Figure 1:
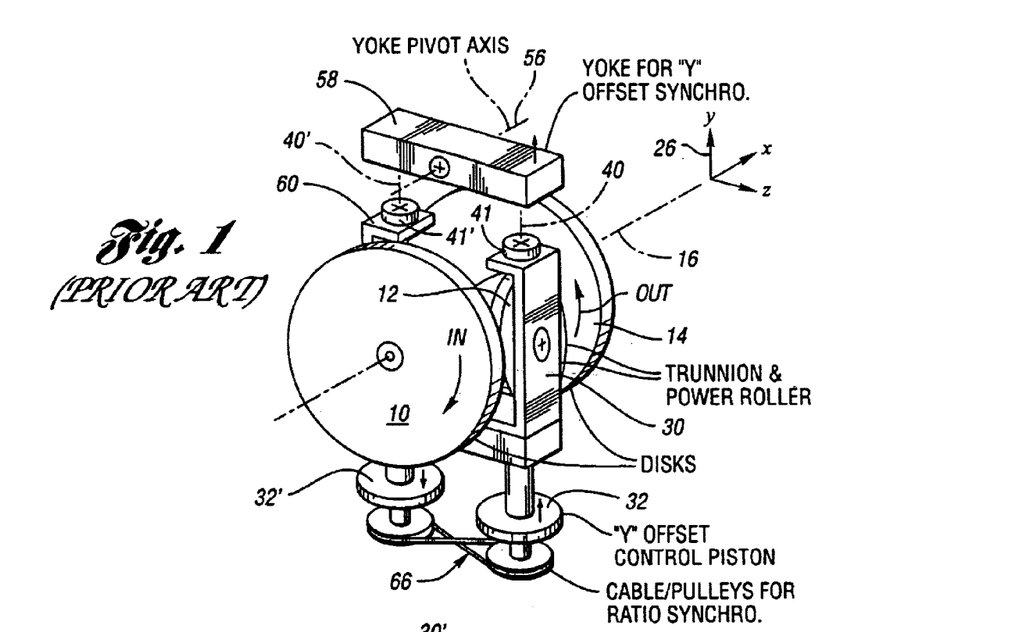
FIG. 1 is a schematic, isometric view of a toroidal disc drive of the kind known in the prior art, which has a trunnion that rotatably supports power rollers in a toroidal friction disc cavity.

In FIG. 1, a torque input disc 10 is in frictional driving engagement with a power roller 12. Roller 12 in turn frictionally engages a torque output disc 14. The discs 10 and 14 define a toroidal cavity, best seen in FIG. 2, which encloses the power rollers. The input disc 10 and the output disc 14 rotate about a common disc axis 16.

Figure 2:
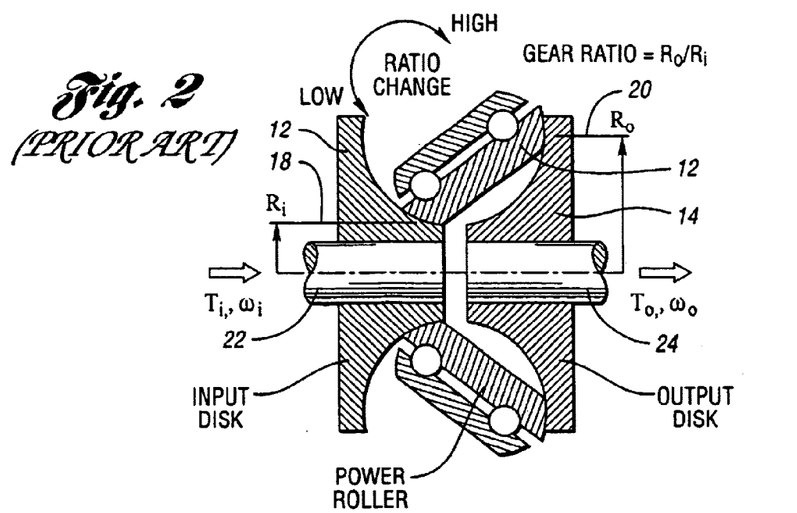
FIG. 2 is a generalized schematic drawing of an input disc, an output disc, and power rollers that frictionally engage the discs to establish a torque flow path.

Power is transferred from disc 10 through the power rollers to the output disc 14. The forces on the discs occur at rolling contact patches that will be described subsequently. The contact patch is developed by lubrication oil at the point of contact. The radii of the input and output contact patches are $R_i$ and $R_o$, respectively. FIG. 2 shows at 18 the contact patch radius at the input disc. The corresponding contact radius at the output disc is shown at 20. Disc 10 is connected to torque input shaft 22, and disc 14 is connected to torque output shaft 24.

The transmission ratio is the ratio of $R_i$ and $R_o$. The ratio is changed by offsetting the rollers in the Y direction, which is indicated at 26 in FIG. 1, relative to the discs.

Figure 3:
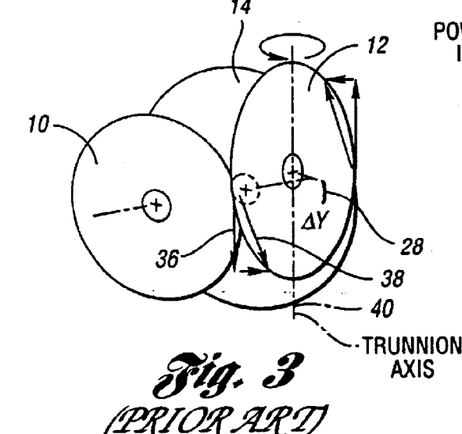
FIG. 3 is a schematic vector diagram of forces created at the contact patch of a drive of the kind shown in FIG. 1 and in FIG. 1a wherein the roller axis is offset relative to the disc axis.

FIG. 3 shows the offset of the axes at 28 for a known design, such as the design of the '236 patent. This action generates a steering moment, which causes the trunnion and the roller to swing to a new ratio as indicated in FIG. 2. When the desired ratio is achieved, the Y direction offset 28 is removed and the steering moment returns to zero. If the Y position of the rollers is held accurately enough so that the steering moment will not exceed the friction of the trunnion bearings, the ratio that is achieved when the rollers assume the position shown in FIG. 2 will be held. To coordinate the movement of the rollers, a yoke mechanism is used to synchronize the Y offset, whereas a cable and pulley mechanism is used to synchronize the ratio. The yoke is shown in FIG. 1 at 30. The corresponding yoke for a design having two pairs of friction discs is shown at 30' in FIG. 1a.

Figure 1A:
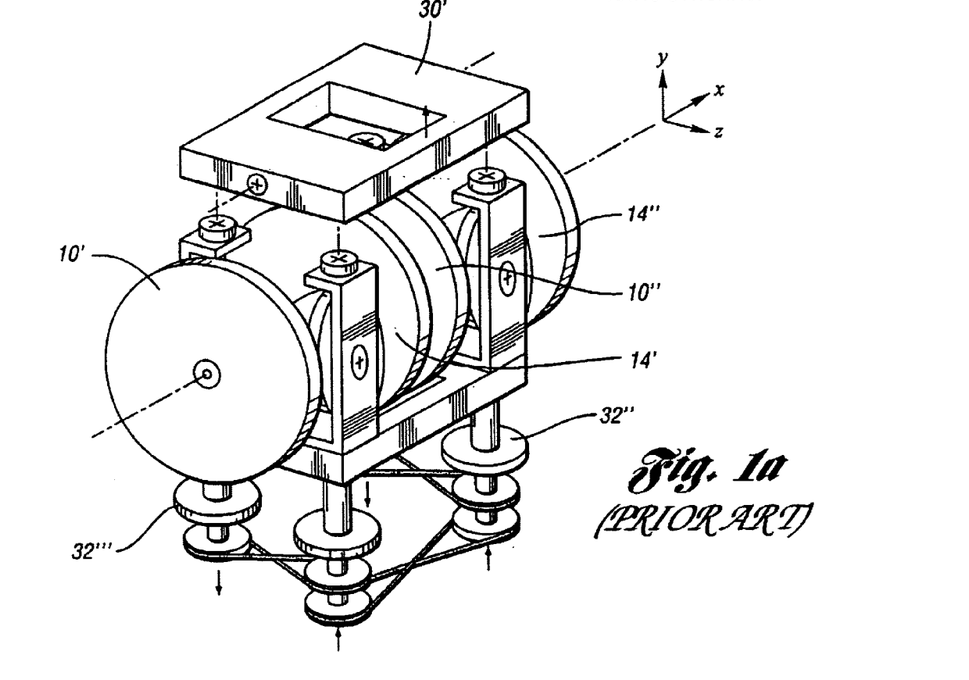
FIG. 1a is a schematic, isometric view of a prior art design wherein two toroidal cavities are used rather than a single cavity as in the case of FIG. 1.

The adjustment of the yoke 30 is achieved by Y offset control pistons 32 and 32'. Corresponding control pistons are shown at 32" and 32'" in the FIG. 1a arrangement. The torque input discs in the arrangement of FIG. 1a are shown at 10' and 10", and the output discs are shown at 14' and 14". The Y position force directly reacts against the torque being transferred. Consequently, the control effort can be very high, which requires control elements that are large and difficult to package. Accordingly, the Y offset designs are practically limited to two power rollers per cavity, which limits the torque capacity of the transmission.

Figure 3A:
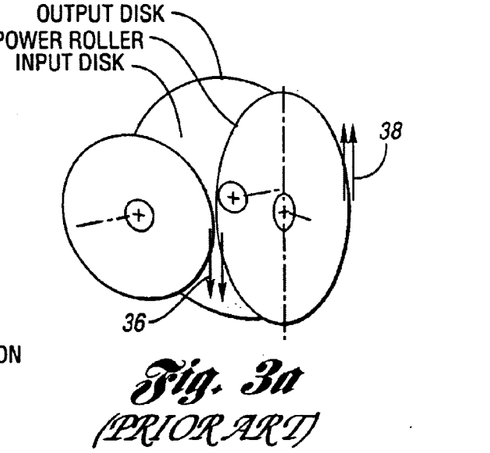
FIG. 3a is a vector diagram of the forces illustrated in FIG. 3 when the power rollers and the friction discs assume a stable condition wherein the driving vector force and the reaction vector force are aligned.

As seen in FIG. 3, the Y offset of the trunnion produces velocity vectors 36 and 38, which develop a steering moment about the trunnion axis 40. When the discs are in a stable position, the velocity vectors are aligned, as shown in FIG. 3a, and no steering vector is developed at the points of contact. When the roller assumes the position shown in FIG. 3b, as in the design of application Ser. No. 09/753,696, the trunnion is angularly offset about the gimbal axis and steering is produced about the trunnion axis. The inclination of the trunnion is designated as $\Delta\theta$ in FIG. 3b.

Figure 4:
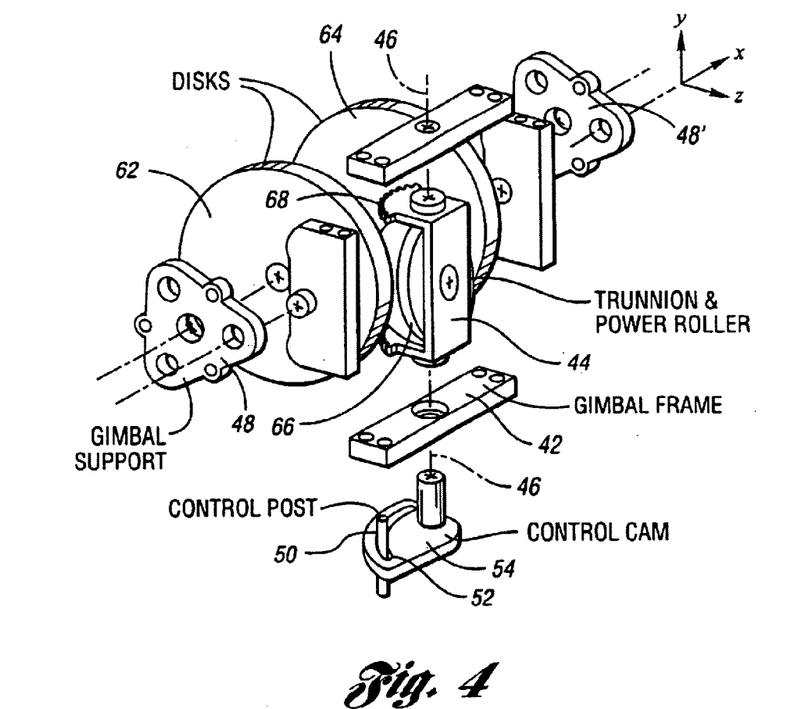
FIG. 4 is a schematic, isometric view of a traction drive and a control cam used to adjust the gimbal frame to effect variations in ratio.

FIG. 4 shows the mechanism for adjusting the gimbal frame about the gimbal axis. The mechanism of FIG. 4 is shown in a detached or exploded view. The gimbal frame is identified by reference numeral 42. The trunnion 44 in the FIG. 4 mechanism is pivoted on the gimbal frame 42 for adjustment about the trunnion axis 46. The gimbal frame is adjustably supported by a gimbal support 48 and a companion gimbal support 48'.

A control post 50 in FIG. 4 is received in a cam slot 52 formed in control cam 54. As the control post is moved, the control cam is adjusted, causing the gimbal frame to incline about its pivots at the gimbal supports 48 and 48'.

The gimbal frame supports the trunnion in the X-axis and Z-axis directions. It takes the place of the piston of the design shown in FIG. 1 by providing support in the Y-axis direction.

As the control cam is adjusted, the gimbal frame is inclined, which produces an angular offset of the gimbal frame and generates a steering moment to produce a change in ratio. This is explained in co-pending patent application Ser. No. 09/753,696.

Figure 10:
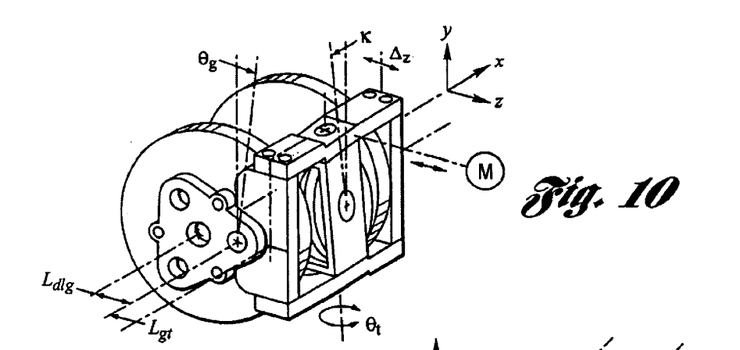
FIG. 10 is a schematic diagram of the traction drive mechanism of FIG. 6 as viewed from a perspective 180° displaced from the perspective of FIG. 6.

An alternative mechanism for providing an angular offset of the gimbal frame is shown in FIG. 10. It comprises an electrical stepper motor "M", which has an output shaft that moves linearly and adjusts the gimbal frame angularly.

The adjustment of the gimbal frame by the cam mechanism of FIG. 4 or by the motor "M" of FIG. 10 allows for a single control system to be attached to a "master" roller and to control a number of "slave" rollers using mechanisms for synchronizing the angular input and the ratio setting among all the rollers. This angular offset architecture can package three power rollers within each toroidal cavity, thereby improving the torque capacity compared to the Y offset design of FIG. 1 and FIG. 1a.

In the design of FIG. 1a, there are two power rollers mounted on the trunnion 30. The Y offset control piston 32 moves the power roller 12 in a positive Y offset direction as the trunnion pivots about yoke axis 56. The trunnion 30 is connected to the yoke 58, which joins the trunnion 30 with a companion trunnion 60 that supports the second roller of the assembly. The rollers are moved about their Y-axis pivots with a steering motion. As the control piston 32 is adjusted, the control piston 32' moves the second roller, not seen in FIG. 1, in a downward direction and the piston 32 moves the roller 12 in an upward direction, and vice versa. The roller supports for the rollers on the yoke will provide for slight articulation of axes 40 and 40' relative to the yoke to accommodate movement of pistons 32 and 30' in opposite directions. Each piston will carry about one-half of the total load on the yoke. The articulation can be achieved by providing semi-spherical bearing points as shown, for example, at 41 and 41' in FIG. 1. As the ratio changes, the power rollers pivot about their respective axes 62 and 64. Ratio synchronism is established in the case of the design in FIG. 1 by a cable and pulley mechanism generally indicated at 66.

Figure 3B:
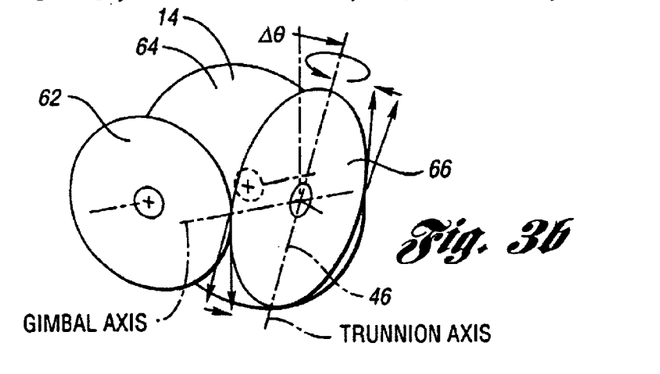
FIG. 3b is a vector diagram of a so-called angular offset feature wherein the trunnion is adjusted about the gimbal frame axis, which creates a steering moment on the rollers.

In the case of the angular offset design shown in FIGS. 3b and 4, the input traction disc 62 corresponds to the input traction disc 10 of the Y offset design of FIGS. 1 and 3. The output traction disc is shown at 64 and the power roller is shown at 66.

Figure 4A:
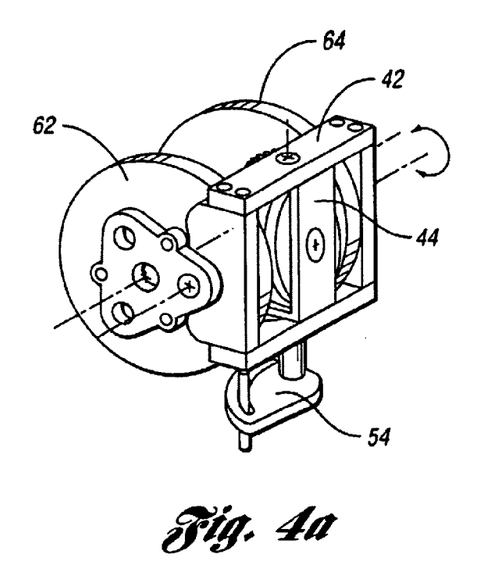
FIG. 4a is a partial assembly view of the structure shown in FIG. 4 wherein the elements that are shown in their exploded positions in FIG. 4 are assembled in a partial assembly.

The elements of FIG. 4, which is an exploded view, is shown in its assembled form in FIG. 4a.

It should be noted that in the design of FIG. 4 the trunnion 44 is provided with gear teeth 68, which have a center corresponding to the trunnion axis 46. A companion power roller, not shown in FIG. 4, would be supported on a second trunnion as explained in co-pending patent application Ser. No. 09/753,696. The second trunnion also would be formed with gear teeth that would engage gear teeth 68. Thus, when trunnion 44 is adjusted about axis 46, the second trunnion for the companion power roller would be adjusted in ratio synchronism with the trunnion 44.

The toroidal traction drive design of the present invention is shown in FIGS. 5, 5a, 5b, 5c, 6, and 6a. In the case of the present invention, the trunnion for power roller 70 is shown at 72. Trunnion 72 oscillates about trunnion axis 74. The torque input friction disc of the present invention is shown at 76, and the torque output friction disc is shown at 80. The common axis of the discs is shown at 78.

Figure 12:
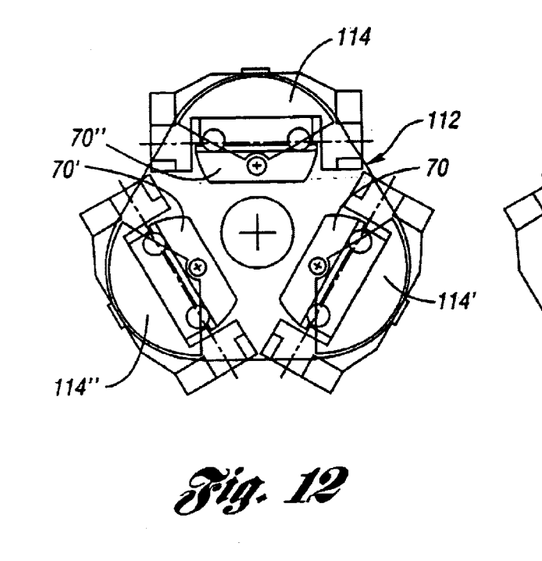
FIGS. 12, 12a, 12b, and 12c show various adjustment mechanisms in schematic form for obtaining simultaneous steering of multiple rollers.
Figure 12A:
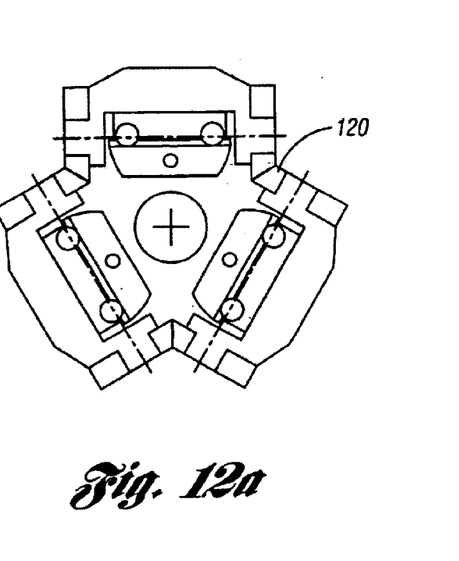
Figure 12B:
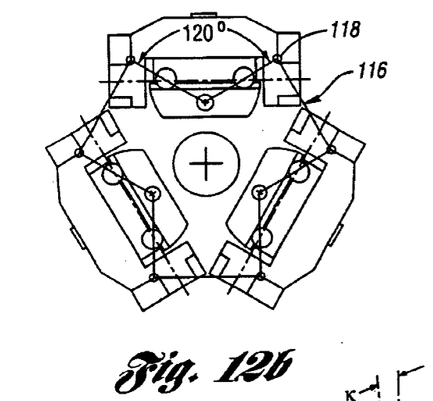
Figure 12C:
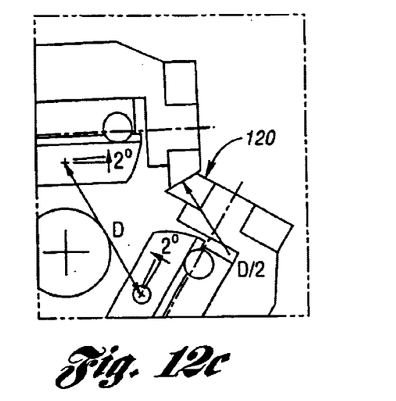

As in the case of the design of FIG. 4, the design of the present invention includes a gimbal support 82. The gimbal oscillates about gimbal axis 86. The trunnion 72 is mounted in the gimbal frame 84 with its axis tilted about the Z-axis. Its axis forms a small angle "K" relative to the Y-axis. This angle hereinafter will be referred to as the caster angle "K". If three rollers are used, as illustrated in FIG. 12, the gimbals for the respective rollers would have their axes offset from disc axis 78 as shown at 86, 86' and 86" in FIG. 5c. If two rollers are used, the axes for the gimbals for the respective rollers would be offset from the disc axis and located about 180°, one with respect to the other.

Figures 5, 5A:
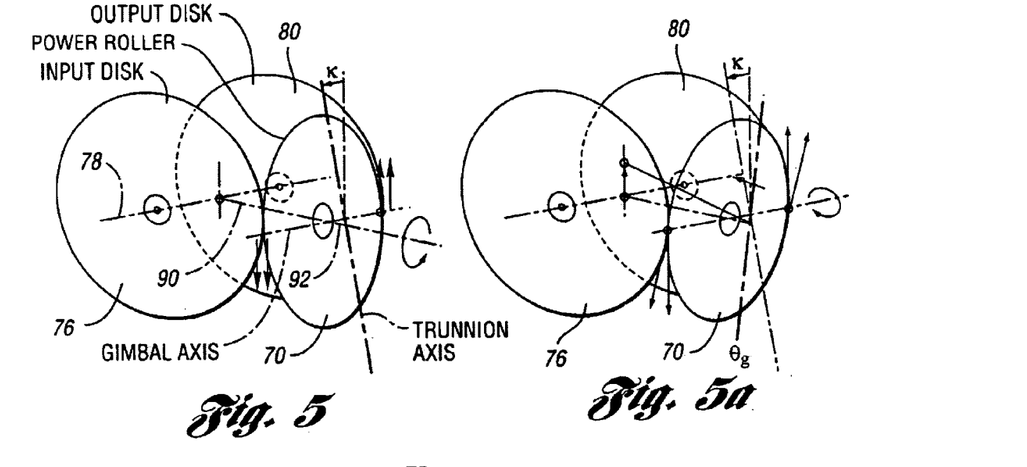
FIG. 5 is a vector diagram of the driving and reaction forces at the contact patches for the improved traction drive of the invention wherein the trunnion is adjusted about the axis of the rollers to produce a so-called caster angle.
FIG. 5a is a vector diagram corresponding to the vector diagram of FIG. 5 wherein the vectors of FIG. 5 have been moved from the equilibrium position of FIG. 5 to the state that creates a steering moment.

A control actuator, such as the electrical stepper motor "M", seen in FIG. 10, or another suitable adjustment mechanism, can be used to adjust the gimbal in the Z-axis direction. This creates a gimbal frame angle shown at $\theta_g$. This action produces an angular offset that generates a steering moment to rotate the trunnion 72. The trunnion continues to rotate to an angle $\theta_t$ until the trunnion reaches an equilibrium state at the new desired ratio condition. The trunnion angle at equilibrium, which is illustrated in FIG. 5, forces the roller axis 88 to intersect with the disc axis 78, which makes the steering moment become zero. In actual practice, equilibrium is expected to occur with some small residual steering angle, as required, to counter the moment due to roller loads acting at some offset to the castered axis.

In the case of a half-toroidal drive, as distinct from a full-toroidal drive, the roller center will be displaced a small amount from the trunnion axis, as indicated at 92 in FIG. 5.

Figures 6, 6A, 6B:
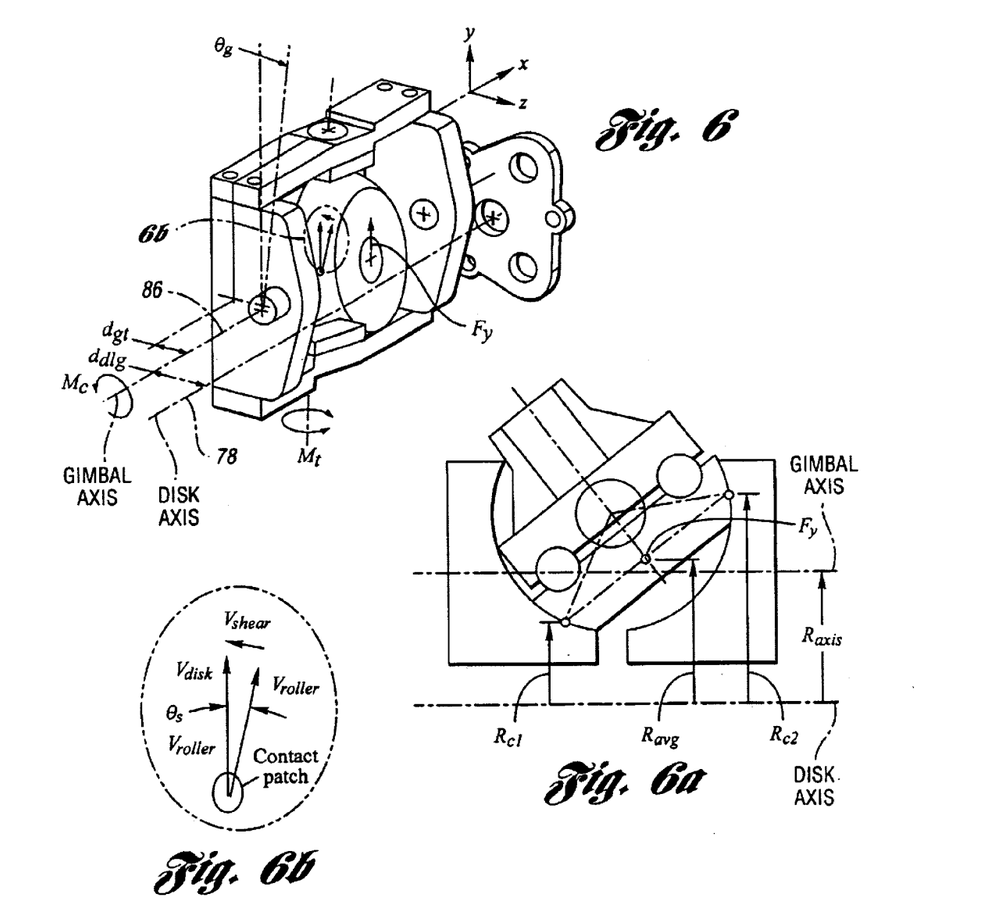
FIG. 6 shows an enhanced view of a traction drive with a trunnion force vector $F_y$ with the trunnion offset at a caster angle.
FIG. 6a is a detail view of a roller with the roller contact radii identified.
FIG. 6b is an enlarged vector diagram showing the resultant of the contact forces acting at the contact patches between the power rollers and the discs.

As in the case of the angular offset design of the co-pending application Ser. No. 09/753,696, the ratio is changed as the power rollers are angularly offset. This is demonstrated in FIG. 2. The angular offset changes ratio when a steering moment $M_t$, seen in FIG. 6, is generated about the trunnion axis due to a steering angle $\theta_s$, seen in FIG. 6b. The steering angle produces shearing of the traction fluid in a direction transverse to the velocity tangents at the contact patch and generates a steering moment that rotates the trunnion and the power roller to a new ratio. When the desired ratio is achieved, the angular offset is removed and the steering moment returns to zero. The ratio is maintained provided that the angular position of the roller is held accurately enough so that the steering moments do not exceed the friction of the trunnion bearings.

Assuming small angles, the steering angle $\theta_s$ (FIG. 6b) can be approximated as follows:

$$\theta_s = \Delta\theta + \tan^{-1}\left[\frac{\sin(\Delta\theta)(R_{axis} - R_c)}{R_c}\right], \quad (1)$$

where $\Delta\theta$ is the angular offset, $R_c$ is the radius from the disc centerline to the point of contact under consideration, and $R_{axis}$ is the radius from the disc centerline to the gimbal axis. Note that when the gimbal axis and disc axis are coincident ($R_{axis}=0$), equation (1) predicts that the steering angle is zero for any angular offset ($\tan^{-1}(-\sin(\Delta\theta))=-\Delta\theta$ for small angles). On the other hand, non-zero steering angles can be achieved if the gimbal axis 86 is moved away from the disc axis 78, as indicated in FIG. 6. The location of the gimbal axis relative to the disc axis thus determines the magnitude of the steering angle and the resulting moment achieved for a given angular offset $\theta_g$.

Figure 7A:
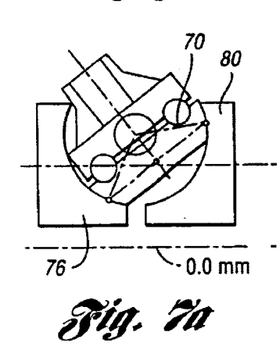
FIGS. 7a, 7b, and 7c are schematic diagrams of the power rollers and the discs as the power rollers are adjusted from an underdrive state, through a one-to-one driving state, to an overdrive state.
Figures 7B, 7C:
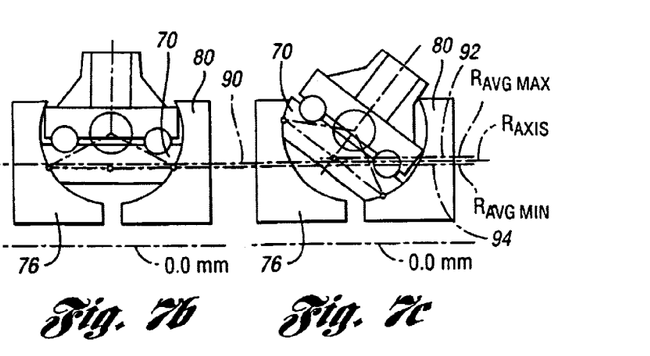

The location of the gimbal axis affects steering, but it also affects the control moment required to control inclination of the gimbal. This control moment, $M_c$, seen in FIG. 6, occurs when the net contact force $F_y$ in the Y direction seen in FIG. 6, acts along a line that is offset from the gimbal axis. It is computed as follows:

$$M_c = F_y(R_{axis} - R_{avg}) \quad (2)$$

where $R_{avg}$ is the average radius of contact. It is clear from Equation (2) that $M_c$ is zero whenever $R_{axis} = R_{avg}$, but this condition cannot always be achieved using a fixed gimbal axis because $R_{avg}$ changes as a function of ratio. This is illustrated in FIGS. 7a, 7b, and 7c.

Figure 8:
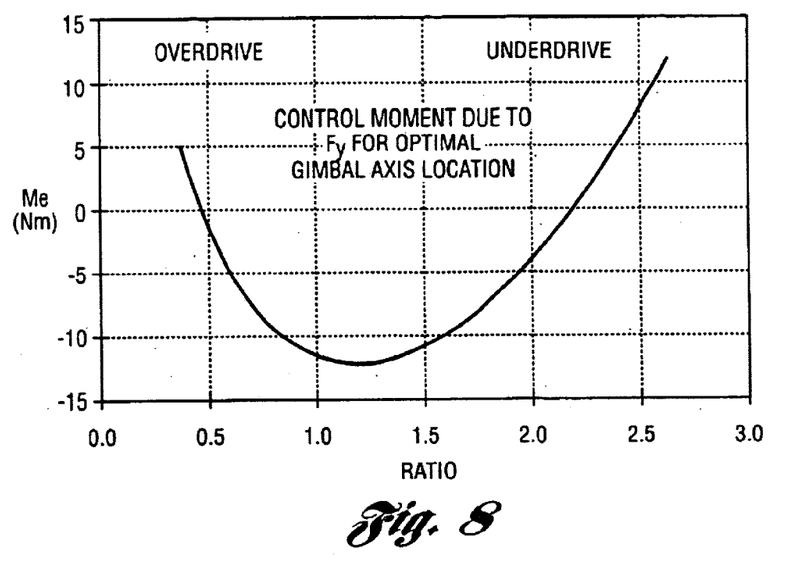
FIG. 8 is a plot showing the control moment due to the force vector $F_y$ for an optimal gimbal axis location as ratio changes.

The radius $R_{axis}$ is shown at 90, the average maximum radius is shown at 92 and the average minimum radius is shown at 94. The radii change as the power rollers 70 move from the underdrive position, shown in FIG. 7a, through the neutral position, shown in FIG. 7b, to the overdrive position, shown in FIG. 7c. A variation in $M_c$ as a function of ratio, holding the input torque constant, can be minimized by locating the gimbal axis at an optimal location relative to the disc axis. In one working embodiment of the invention, $M_c$ is minimized when $R_{axis}$ equals 57.6 mm. Considering a torque input of 105 Nm per roller over a ratio range from 0.37 to 2.64, $M_c$ changes through a range of plus or minus 12 Nm. This is demonstrated graphically in FIG. 8 where $M_c$ is plotted against ratio as the ratio changes from an overdrive state to an underdrive state.

The optimal axis location does not lie at the midpoint of the range of $R_{avg}$ because $F_y$ changes as a function of ratio. By locating the gimbal axis at the radius having a minimum variation in $M_c$, the control effort is effectively decoupled from the support requirements. In this manner, the angular offset control system needs only to provide a modest control effort. For example, a plus or minus 68N control force at 175 mm radius would be needed for angular offset control in contrast to plus or minus 6400 N for a Y offset control system of the kind illustrated in FIG. 1.

Figure 9:
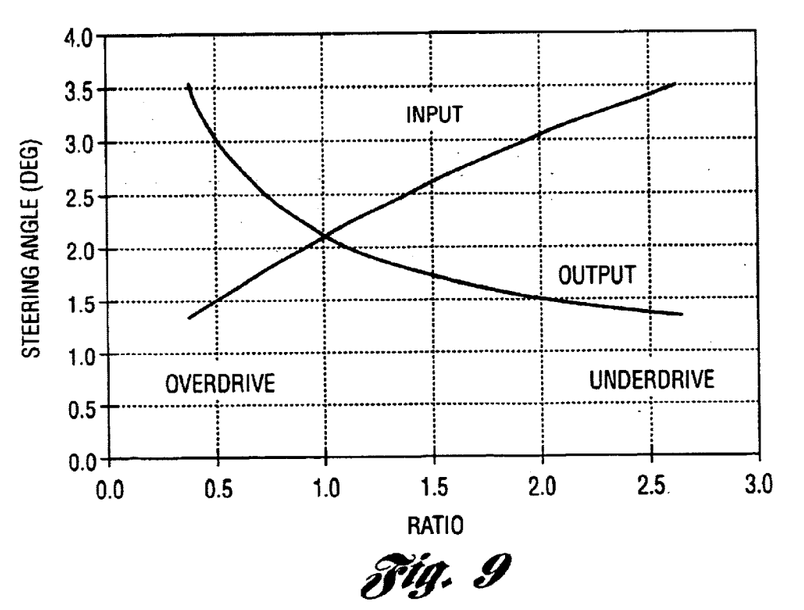
FIG. 9 shows the steering angle on the power rollers for various ratios, the angles for the input disc being plotted together with the angles for the output disc.

The angular offset geometry can be configured to generate steering, which is true also in the case of a Y offset control input such as the design of FIG. 1. In the angular offset design of FIG. 4, with optimal gimbal axis placement, the steering angles at the points of contact are compared for a 2 mm Y offset and a 2° inclination of the gimbal. Under these conditions, the steering angle differences for the designs at the input and output points of contact were indiscernible. This is shown in FIG. 9. The angular offset design of FIG. 4 can generate the same steering angles as the Y offset design of FIG. 1.

Because the angular offset design of FIG. 4 uses a different mechanism to generate steering than the Y offset design of FIG. 1, the angular offset design requires a different method of control. The control system translates a control input into a change in ratio that is smooth and stable upon completion. In the case of the design of FIG. 4, a cam was used to translate trunnion rotation to ratio control. In addition to synchronizing mechanisms for angular offset, the control system of a Y offset design also requires that secondary mechanisms be used to synchronize the ratio from one roller to the next. This may involve the gearing teeth 68 described previously with reference to FIG. 4. Co-pending patent application Ser. No. 09/753,696 describes also other synchronizing techniques. In contrast to this synchronizing technique of FIG. 4, which uses, for example, offset cam based control, the feedback mechanism of the present invention provides ratio synchronism by incorporating in the design a caster angle on the trunnion axis. By castering the trunnion axis, a single stable ratio position is defined for a given inclination angle.

When multiple trunnions are mounted at the same caster angle, each trunnion seeks the same ratio for a given angular offset without the need for secondary ratio synchronizing mechanisms, as in the case of the designs of the '236 patent and application Ser. No. 09/753,696.

Figure 5B:
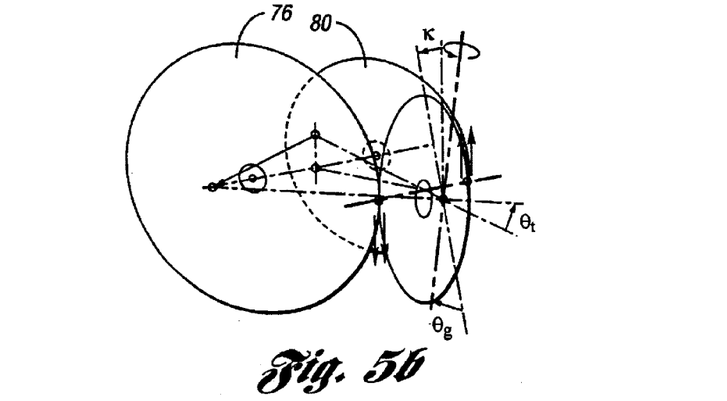
FIG. 5b is a vector diagram corresponding to the vector diagram of FIG. 5a wherein the vector forces at the contact patches are in an equilibrium state following the adjustment of the drive to an overdrive condition.
Figure 5C:
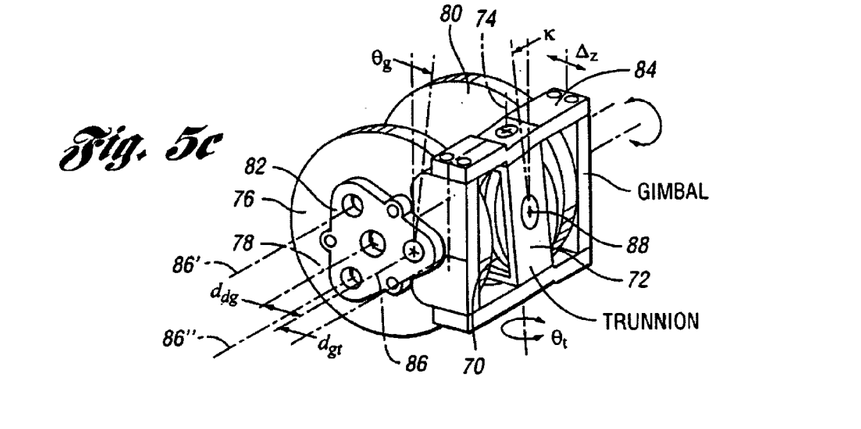
FIG. 5c is a schematic, isometric view of a traction drive with the trunnion offset at a caster angle.

In a typical control event, the trunnion is inclined with the displacement $\Delta_z$, seen in FIG. 5c, which produces an angular offset $\theta_g$, also seen in FIGS. 5a and 5b. This produces a steering moment, $M_t$, that rotates the trunnion to an angle $\theta_t$, where the steering moments equal zero and the devices at equilibrium. This is illustrated in FIG. 5b where the roller axis intersects the disc axis in the X-Y plane. This relationship can be approximated as follows:

$$\theta_t \cong \tan^{-1}\left[\frac{1}{Sk}\left(\frac{L_{gt}S\theta_g}{L_{dlg} + L_{gt}C\theta_g} - T\theta_g\right)\right] \quad (3)$$

Figure 10A:
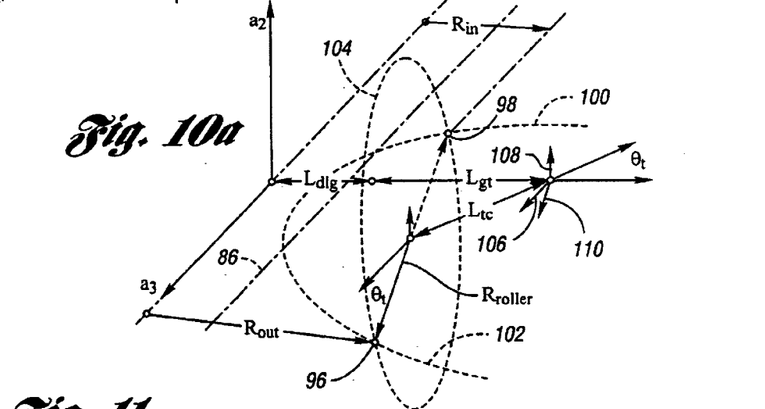
FIG. 10a is a vector diagram of forces acting on the rollers for the diagram of FIG. 10.

The value $\theta_t$ is shown in FIG. 10a. Converting trunnion rotation to coordinates of input and output radii gives the following:

$$R_{in} = L_{dlg} + L_{gt} = L_{tc}(C\theta_t) - R_{roller}(S\theta_t) \quad R_{out} = L_{dlg} + L_{gt} - L_{tc}(C\theta_t) + R_{roller}(S\theta_t), \quad (4)$$

where $L_{tc}$ is the distance from the trunnion axis to the contact plane and $R_{roller}$ is the distance from the roller axis to the contact points. The contact point for the output disc is shown in FIG. 10a at 96. The contact point for the input disc is shown at 98. Velocity vector 106 is in the direction of the vector $a_3$ in FIG. 10. Velocity vector 108 is in the direction of the $a_2$ vector in FIG. 10a. Vector 110 shows the change in direction due to the $\theta_t$ rotation.

Using the input and output radii, the ratio can be calculated as follows:

$$\text{Ratio} = R_{out}/R_{in} \quad (5)$$

Figure 11:
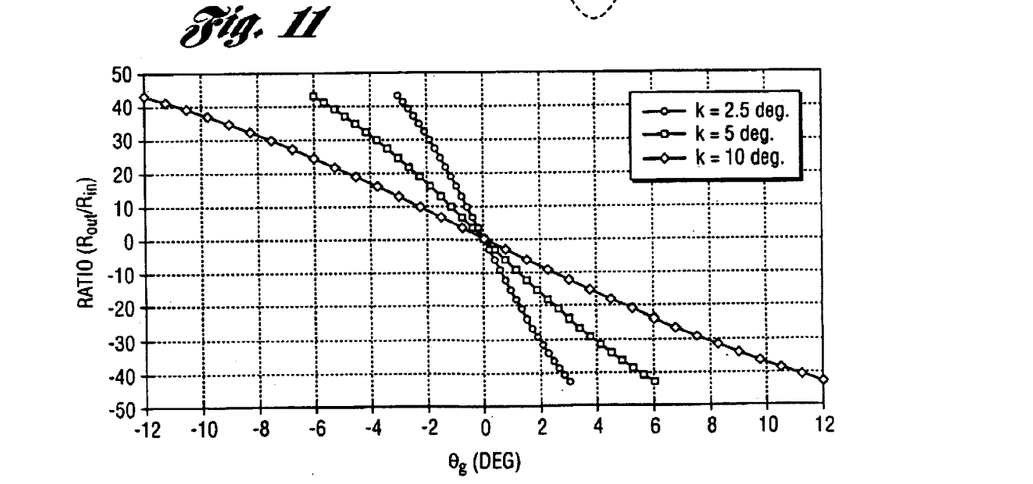
FIG. 11 is a plot of the gimbal angle for various ratios, the plots being generated for various caster angles.
Figure 11A:
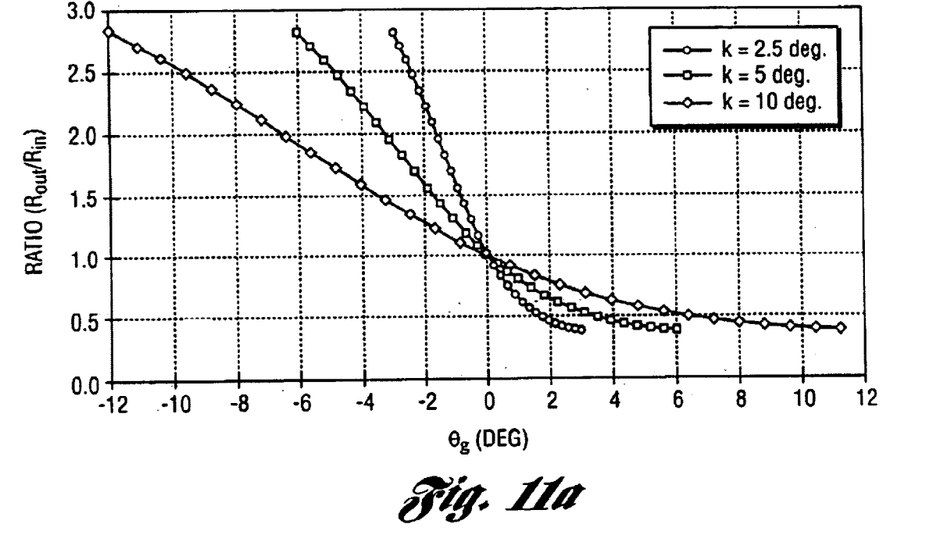
FIG. 11a is a plot of transmission ratio for various gimbal angles, each plot being generated with different caster angles.

FIG. 11 shows samples of the relationship between gimbal angle and trunnion angle for three different caster angles. FIG. 11a shows the relationship of ratio to gimbal angle for three different caster angles; specifically, caster angles of 2.5°, 5° and 10°. FIGS. 12, 12a, 12b, and 12c show various techniques for synchronizing steering in the angular offset design of FIG. 4, as well as the angular offset feature of the present invention.

In the case of the design of FIGS. 12, 12a, 12b, and 12c, there are three power rollers, separately identified by reference numerals 70, 70' and 70". A tensioned cable 112 is keyed into features formed on each gimbal support. The cable would be wrapped around semicircular members 114, 114', and 114", connected to each gimbal support, in order to synchronize the angular offset. In an alternative arrangement, a series of hinged links 116, comprising elements that are hinged at hinge points 118, could be attached between the gimbal frames at 180° in the case of a two roller design or at 120° for a three roller design. In still another design approach, circular cams 120, having cam details at a cam interface, could be located on each gimbal frame to contact along the lines of symmetry between the frames.

Although each trunnion could be fitted with its own actuator, synchronizing mechanisms could be used to actuate a number of slave cylinders in response to the control of the single master roller.

Figure 13:
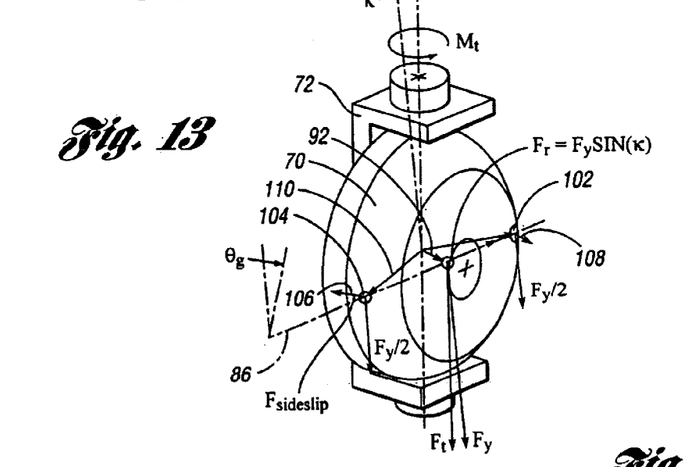
FIG. 13 is a vector diagram that illustrate the forces creating trunnion moments due to caster angle.
Figure 13B:
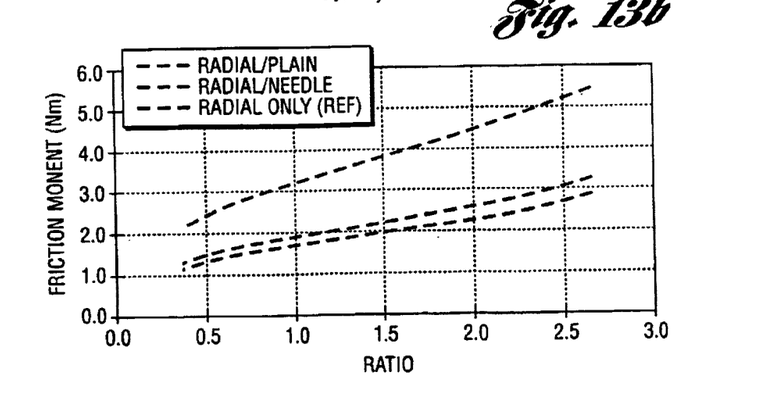
FIG. 13b is a plot of the bearing friction moment as a function of ratio for three kinds of bearings.

FIG. 13 shows that only a very small offset in $\theta_g$ is needed to offset the moment due to the caster angle. For example, where a caster angle K is equal to 2.5° and gimbal angle $\theta_g$ is equal to 5°, the required offset of $\theta_g$ would be 0.021°, which is 0.40% of the total span of the gimbal angle. The estimated torque loss due to the required gimbal angle offset is estimated at 0.4 Nm, which represents a reduction in the efficiency of only 0.1%. This data, as well as other data for other caster angles and gimbal angles is shown in the following table:

| Required Gimbal Angle Offset As A Fraction Of Total Gimbal Stroke | | | |
|---|---|---|---|
| castor angle κ | 2.5° | 5° | 10° |
| $\theta_g$ span | 5° | 12° | 25° |
| req'd $\theta_g$ offset (ratio = 2.64) | 0.021° | 0.042° | 0.084° |
| req'd $\theta_g$ offset as % of span | 0.40% | 0.35% | 0.34% |
| estimated torque loss | 0.4 Nm | 0.6 Nm | 1.2 Nm |
| efficiency reduction (%) | 0.1% | 0.15% | 0.3% |

In FIG. 13, the force vector $F_y$ is the force required to transmit torque. The thrust load component along the trunnion axis is shown at $F_t$. The bearing force acting in the X-axis direction is the sine value of K times the force $F_y$. The cosine component of the force $F_y$ is force vector $F_r$.

$F_y$ is the sum of the Y-axis components of the forces acting in the contact patches 102 and 104. A sideslip force $F_{sideslip}$ is shown at 106, and a corresponding sideslip force for contact patch 102 is shown at 108. The radius line from the trunnion axis to the contact patch 104 is shown at 110.

Although particular embodiments of the invention have been disclosed, it will be apparent to persons skilled in the art that modifications may be made without departing from the scope of the invention. All such modifications and equivalents thereof are intended to be covered by the following claims.

What is claimed:

1. An infinitely variable ratio traction drive comprising:
   a torque input disc and a torque output disc, the discs having semi-toroidal surfaces disposed in juxtaposed relationship on a common rotary disc axis, one with respect to the other, to define a semi-toroidal cavity;
   at least one torque-transmitting roller located in the semi-toroidal cavity;
   the roller contacting each disc surface at a torque-transmitting contact patch;
   a trunnion rotatably supporting the roller for rotation about a roller axis;
   a gimbal frame rotatably supported for adjustment about a gimbal frame axis parallel to the common rotary disc axis;
   the trunnion being supported on the gimbal frame for rotary adjustment about a trunnion axis transversely disposed relative to the common disc axis;
   the trunnion axis being displaced angularly through a caster angle about the roller axis, the trunnion axis displacement being in a plane that is parallel to the common disc axis;
   a fixed gimbal support for supporting each disc and the gimbal frame; and
   means for rotatably adjusting the trunnion angularly about the gimbal frame axis whereby the roller supported on the trunnion rotates in an angularly offset plane, thereby creating a roller steering moment that acts on the roller to tilt the roller to a new ratio position.

2. The traction drive set forth in claim 1 including multiple rollers in the semi-toroidal cavity arranged in pairs, the rollers of the pair being mounted on separate trunnions on opposite lateral sides of the rotary disc axis.

3. The traction drive set forth in claim 2 wherein a steering moment adjusts each roller to a new ratio position through a steering angle that is expressed as:

$$\theta_s = \Delta\theta + \tan^{-1}\left[\frac{\sin(\Delta\theta)(R_{axis} - R_c)}{R_c}\right],$$

where $\Delta\theta$ is the angular offset, $R_c$ is the radius from the common rotary disc axis to the point of contact of the disc and the roller, and $R_{axis}$ is the radius for the common rotary disc axis to the trunnion frame axis.

4. The traction drive set forth in claim 1 including multiple rollers in the semi-toroidal cavity disposed at about 120° angular intervals about the rotary axis of the discs whereby three rollers between the discs transfer torque between the discs.

5. The traction drive set forth in claim 4 wherein a steering moment adjusts each roller to a new ratio position through a steering angle that is expressed as:

$$\theta_s = \Delta\theta + \tan^{-1}\left[\frac{\sin(\Delta\theta)(R_{axis} - R_c)}{R_c}\right],$$

where $\Delta\theta$ is the angular offset, $R_c$ is the radius from the common rotary disc axis to the point of contact of the disc and the roller, and $R_{axis}$ is the radius for the common rotary disc axis to the trunnion frame axis.

6. The traction drive set forth in claim 1 wherein a steering moment adjusts each roller to a new ratio position through a steering angle that is expressed as:

$$\theta_s = \Delta\theta + \tan^{-1}\left[\frac{\sin(\Delta\theta)(R_{axis} - R_c)}{R_c}\right],$$

where $\Delta\theta$ is the angular offset, $R_c$ is the radius from the common rotary disc axis to the point of contact of the disc and the roller, and $R_{axis}$ is the radius for the common rotary disc axis to the trunnion frame axis.

7. An infinitely variable ratio traction drive comprising:
   a torque input disc and a torque output disc, the discs having semi-toroidal surfaces disposed in juxtaposed relationship on a common rotary disc axis, one with respect to the other, to define a semi-toroidal cavity;
   multiple torque-transmitting rollers located in the semi-toroidal cavity;
   the rollers contacting each disc surface at a torque-transmitting contact patch;

a separate trunnion rotatably supporting each roller for rotation about a roller axis;

a gimbal frame rotatably supported for adjustment about a gimbal frame axis parallel to the common disc axis;

the trunnion being supported on the gimbal frame for rotary adjustment about a trunnion axis transversely disposed relative to the common disc axis;

the trunnion axis being displaced angularly through a caster angle about the roller axis, the trunnion axis displacement being in a plane that is parallel to the common disc axis;

a fixed gimbal support for supporting each disc and the gimbal frame; and means for rotatably adjusting the gimbal frame angularly about the gimbal frame axis whereby the roller supported on the trunnion rotates in an angularly offset plane, thereby creating a roller steering moment that acts on the roller to tilt the roller to a new ratio position;

the rollers in the semi-toroidal cavity being mounted on separate trunnions on opposite lateral sides of the rotary disc axis; and means for drivably connecting together the trunnions for the rollers whereby angular adjustment of one roller under the influence of a steering moment acting thereon is duplicated with corresponding angular adjustment of each other roller to achieve steering synchronism.

8. The traction drive set forth in claim 7 wherein the gimbal frame of one roller is drivably connected to the gimbal frame of each other roller whereby the one roller is tilted about its trunnion axis in steering synchronism with corresponding tilting movement of each other roller.

9. The traction drive set forth in claim 7 wherein a common caster angle is used for each trunnion, each trunnion thereby seeking the same ratio for a given angular adjustment of the gimbal frame without the need for secondary ratio synchronization mechanisms.

10. The traction drive set forth in claim 9 wherein the trunnion is displaced about the gimbal frame axis thereby producing an angular offset $\theta_g$ to produce a steering moment $M_t$ that rotates the trunnion to an angle $\theta_t$, the steering moments being equal zero when the drive is in equilibrium, the relationship of the control variables then being approximated as:

$$\theta_t \cong \tan^{-1}\left[\frac{1}{S\kappa}\left(\frac{L_{gt}S\theta_g}{L_{dlg}+L_{gt}C\theta_g} - T\theta_g\right)\right],$$

where $k$=caster angle $\theta_g$=gimbal angular offset

L=the distance between the gimbal axis and the trunnion axis $L_{dlg}$=the distance between the disc axis and the gimbal axis.

11. The traction drive set forth in claim 10 wherein trunnion rotation is converted to coordinates of input and output radii as follows:

$$R_{in}=L_{dlg}+L_{gt}-L_{tc}(C\theta_t)-R_{roller}(S\theta_t)$$

$$R_{out}=L_{dlg}+L_{gt}-L_{tc}(C\theta_t)+R_{roller}(S\theta_t),$$

where $L_{tc}$ is the distance from the trunnion axis to a contact plane defined by points of contact of the rollers on the discs and $R_{roller}$ is the distance from the roller axis to the contact points.

* * * * *